UNITED STATES PATENT OFFICE.

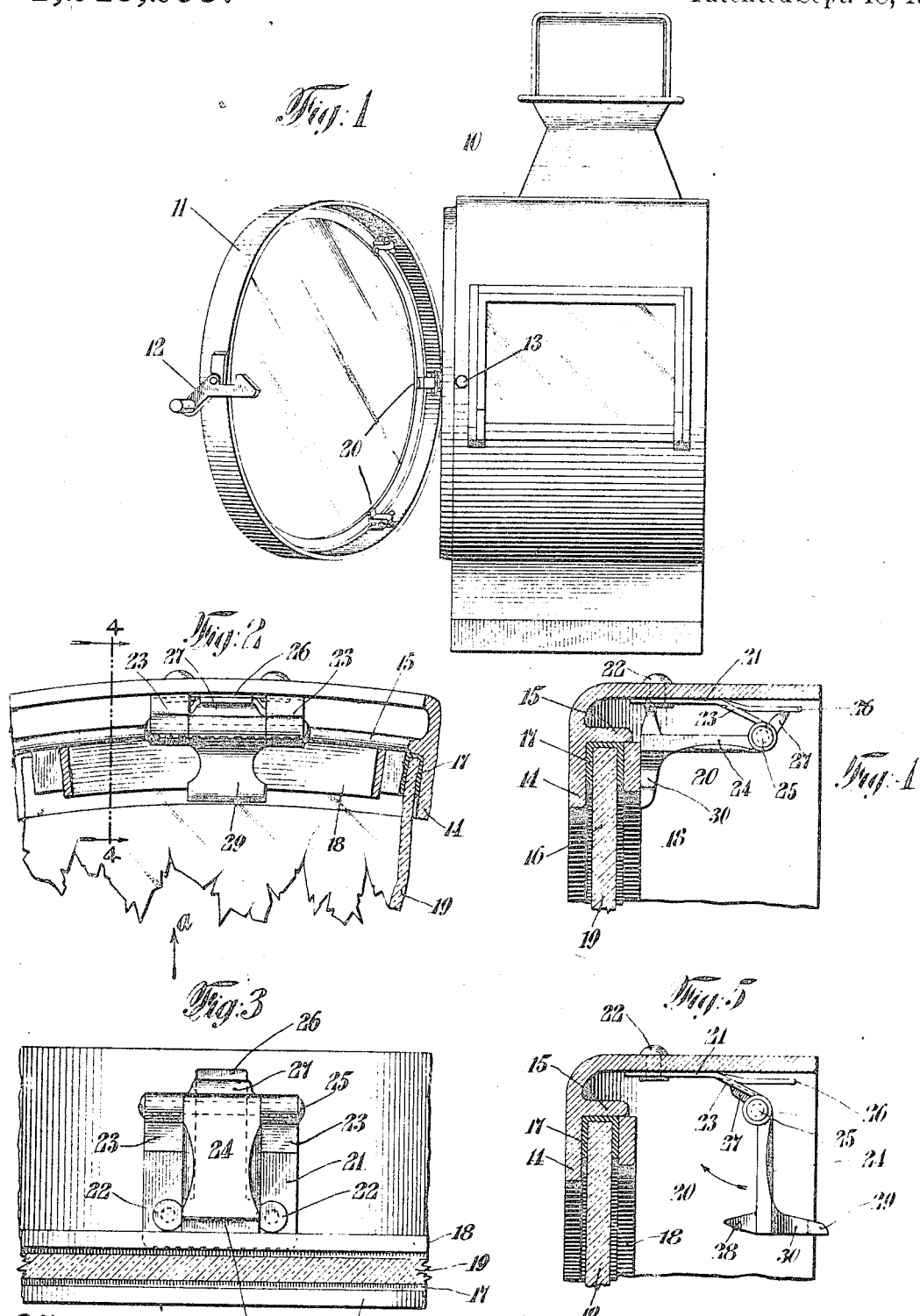

ROBERT BLACK, OF SCARSDALE, NEW YORK, ASSIGNOR TO THE DRESSEL RAILWAY LAMP WORKS, A CORPORATION OF NEW YORK.

GLASS-HOLDER FOR HEADLIGHTS.

1,240,299.

Specification of Letters Patent. Patented Sept. 18, 1917.

Application filed January 2, 1915. Serial No. 202.

*To all whom it may concern:*

Be it known that I, ROBERT BLACK, a citizen of the United States, residing at Scarsdale, Westchester county, in the State of New York, have invented certain new and useful Improvements in Glass-Holders for Headlights, of which the following is a full, clear, and exact specification.

My invention relates to improvements in lanterns, and the same has for its object more particularly to provide a simple, efficient and reliable means for securing the front glass in headlights, lanterns or other structures.

Further, said invention has for its object to provide means for securing the front glass in a headlight in such manner that the same may be easily removed therefrom when it is desired to clean or replace the same.

Further, said invention has for its object to provide means for securing the front glass in a headlight in such manner that the same may be readily inserted or removed therefrom, and which securing means further serves so to hold the glass in position therein that all rattling or vibration thereof in its frame will be entirely prevented.

To the attainment of the aforesaid objects and ends, my invention consists in the novel details of construction, and in the combination, connection and arrangement of parts hereinafter more fully described and then pointed out in the claims.

In the accompanying drawings forming part of this specification wherein like numerals of reference indicate like parts,—

Figure 1 is a side view of a headlight with one form of securing device constructed according to and embodying my said invention applied thereto;

Fig. 2 is an enlarged detail face view showing a portion of the front cover frame and the securing means for maintaining the glass in position within said frame;

Fig. 3 is a detail face view looking in the direction of the arrow *a*, Fig. 2;

Fig. 4 is a sectional view on the line 4—4 of Fig. 2 showing a part of the frame, the cover, the glass therein, and one of the securing devices locked to maintain said cover glass in position within said frame, and Fig. 5 is a similar view showing the securing device released to permit of the removal of the glass and its related parts.

In the accompanying drawings 10 designates a headlight of the usual general construction provided at its front with a hinged cover comprising a frame 11 which is adapted to be secured to its closed position upon the lantern casing by a hook 12 adapted to engage with a stud 13 provided upon the side of the lantern casing.

The front cover of the headlight comprises an annular frame 11 having an inwardly extending flange 14 at its forward edge and a rearwardly extending flange or rim 15 arranged adjacent thereto. 16 denotes a transparent section preferably of glass provided at its edge with a resilient, annular packing 17. To the rear of said packing is disposed a flat metal guard ring 18 which fits snugly within the rearwardly extending flange or rim 15, and bears against the inner face of the packing 17 inclosing the edge of the glass 19.

Upon the inner horizontal edge of the frame 11 are secured a series of securing devices 20, 20 which are arranged equally spaced apart. Each of said securing devices comprises a base 21 which is rigidly secured by rivets 22 adjacent to its forward end to the inner side of the frame 11. From the opposite edges of said base 21 extend inwardly inclined bearing members 23, 23 between which is pivotally mounted a detent 24 supported upon a pin 25 whose ends are secured in the bearings 23, 23. From the base 21 extends slightly upwardly and rearwardly parallel with said base a spring tongue 26 which engages with an inclined toe 27 provided at the inner or pivoted end of the detent 24. The outer or free end of said detent 24 is provided with a toe 28 which serves as a stop to limit the downward movement of said detent 24 in order to maintain said detent parallel with said base. To facilitate the adjustment of said detent to its operative position the outer surface of the toe 28, which engages with the guard ring 18, is beveled. The detent 24 is provided upon its upper surface at its free end with an upwardly extending foot 29 having a flat outer face 30 which is adapted to engage with the inner side of the ring 18 when the device is brought into operative engagement to hold the glass in position within said frame.

It is to be noted that while I have shown my invention in connection with the glass of a headlight, the same is nevertheless applicable to other structures in which a removable section is to be confined within a frame or other inclosure.

Having thus described my invention, what I claim and desire to secure by Letters Patent is:—

1. In a lantern, the combination with the frame thereof, and a removable section thereon, of a series of securing devices on said frame each comprising a pivoted member having a free end for securing said removable section in position, and yielding means for holding said pivoted member in its operative position, substantially as specified.

2. In a lantern, the combination with the frame thereof, and a removable section thereon, of a series of members each of which is pivotally supported upon said frame and adapted to be rotated in a plane at an angle to the plane of said removable section to occupy its operative or inoperative positions, the free ends of said members serving to secure said removable section in position when said members are in their operative positions, substantially as specified.

3. In a lantern, the combination with the frame thereof, and a removable section thereon, of a series of members each of which is pivotally supported upon said frame and adapted to be rotated in a plane at right angles to the plane of said removable section to occupy its operative or inoperative positions, the free ends of said members serving to secure said removable section in position when said members are in their operative positions, substantially as specified.

4. In a lantern, the combination with the frame thereof, and a removable section thereon, of a series of members each of which is pivotally supported upon said frame and adapted to be rotated in a plane at an angle to the plane of said removable section to occupy its operative or inoperative positions, the free ends of said members serving to secure said removable section in position when said members are in their operative positions and means for holding said members in their operative positions, substantially as specified.

5. In a lantern, the combination with the frame thereof, and a removable section thereon, of a series of members each of which is pivotally supported upon said frame and adapted to be rotated in a plane at an angle to the plane of said removable section to occupy its operative or inoperative positions, the free ends of said members serving to secure said removable section in position when said members are in their operative positions and yielding means for holding said members in their operative positions, substantially as specified.

6. In a lantern, the combination with the frame thereof, and a removable section thereon, of a series of securing devices on said frame each comprising a base, a pivoted member thereon adapted to be rotated in a plane at an angle to the plane of said removable section to occupy its operative or inoperative positions, and means to hold said pivoted member in its operative position, the free ends of said pivoted members serving to secure said removable section in position when said pivoted members are in their operative positions, substantially as specified.

7. In a lantern, the combination with the frame thereof, and a removable section thereon, of a series of securing devices on said frame each comprising a base, a pivoted member thereon, an angular foot at the free end of said pivoted member for securing said removable section, and yielding means for holding said pivoted member and said foot in operative position, substantially as specified.

8. In a lantern, the combination with the frame thereof and a removable section thereon, of a series of securing devices on said frame each comprising a base, a bearing thereon, a pivoted member mounted in said bearing, a foot at one end of said pivoted member adapted to confine said removable section, and yielding means for holding said pivoted member and said foot in operative position, substantially as specified.

9. In a lantern having a recessed portion and a removable section yieldingly supported therein, in combination with a series of securing devices each comprising a base, a pivoted member thereon, an angular foot at the free end of said pivoted member for maintaining said removable section in position, and yielding means for holding said pivoted member and said foot in operative position, substantially as specified.

10. In a lantern, a frame having a recessed portion and a removable cover section yieldingly disposed therein, in combination with a series of securing devices each comprising a base, a bearing thereon, a pivoted member mounted in said bearing, a foot at one end of said pivoted member adapted to confine said removable cover section in position within said frame, and means for holding said pivoted member in engagement with said removable cover section, substantially as specified.

11. In a lantern, a frame having a recessed portion and a removable cover section yieldingly disposed therein, in combination with a series of securing devices each comprising a base secured to said frame, a bearing thereon, a pivoted member mounted in said bearing, a foot at one end of said pivoted member adapted to confine said removable section in position within said frame and spring means for holding said pivoted member and said foot in operative position, substantially as specified.

12. In a lantern, a frame having a recessed portion and a removable cover section yieldingly disposed therein, in combination with a series of securing devices, each comprising a base secured to said frame, a bearing thereon, a pivoted member mounted in said bearing, a foot at one end of said pivoted member, spring means upon said base engaging said pivoted member for holding the same and said foot at the end thereof in operative position to confine said removable section in position within said frame, substantially as specified.

13. In a lantern, a frame having a recessed portion, a removable cover section therein, a yielding annular packing disposed upon and inclosing the edge of said removable section, an annular member disposed to the rear of said removable section and engaging the annular packing thereon, in combination with a series of securing devices each comprising a base secured to said frame, a bearing thereon, a pivoted member mounted in said bearing, a foot at one end of said pivoted member adapted to confine said removable section in position within said frame, and means for holding said pivoted member and said foot in operative position, substantially as specified.

14. An apparatus of the character described comprising a base, a bearing extending upwardly therefrom, a pivoted member mounted in said bearing, a foot extending angularly from the free end of said pivoted member, means arranged upon said pivoted member adapted to limit the downward movement thereof, and spring means for maintaining said pivoted member in position parallel to said base with the limiting means thereon in engagement with said base, substantially as specified.

15. An apparatus of the character described comprising a base, a bifurcated bearing extending upwardly therefrom, a member pivotally mounted at one end in said bearing, a projection arranged angularly to said pivoted member and extending therefrom, a foot extending angularly from the free end of said pivoted member, a stop extending laterally from the opposite side of said pivoted member in line with said foot, whereby to limit the downward movement of the free end of said pivoted member, and a spring, formed integrally with said base, having its free end in engagement with the projection on said pivoted member whereby to hold said pivoted member in operative position, substantially as specified.

Signed at the city of New York, in the county and State of New York, this 20th day of October, one thousand nine hundred and fourteen.

ROBT. BLACK.

Witnesses:
CONRAD A. DIETERICH,
JOSEPH G. QUINN, Jr.